Nov. 27, 1928.
H. BEIERSDORF
1,693,362
THERMAL PROTECTIVE SYSTEM
Filed Oct. 29, 1925
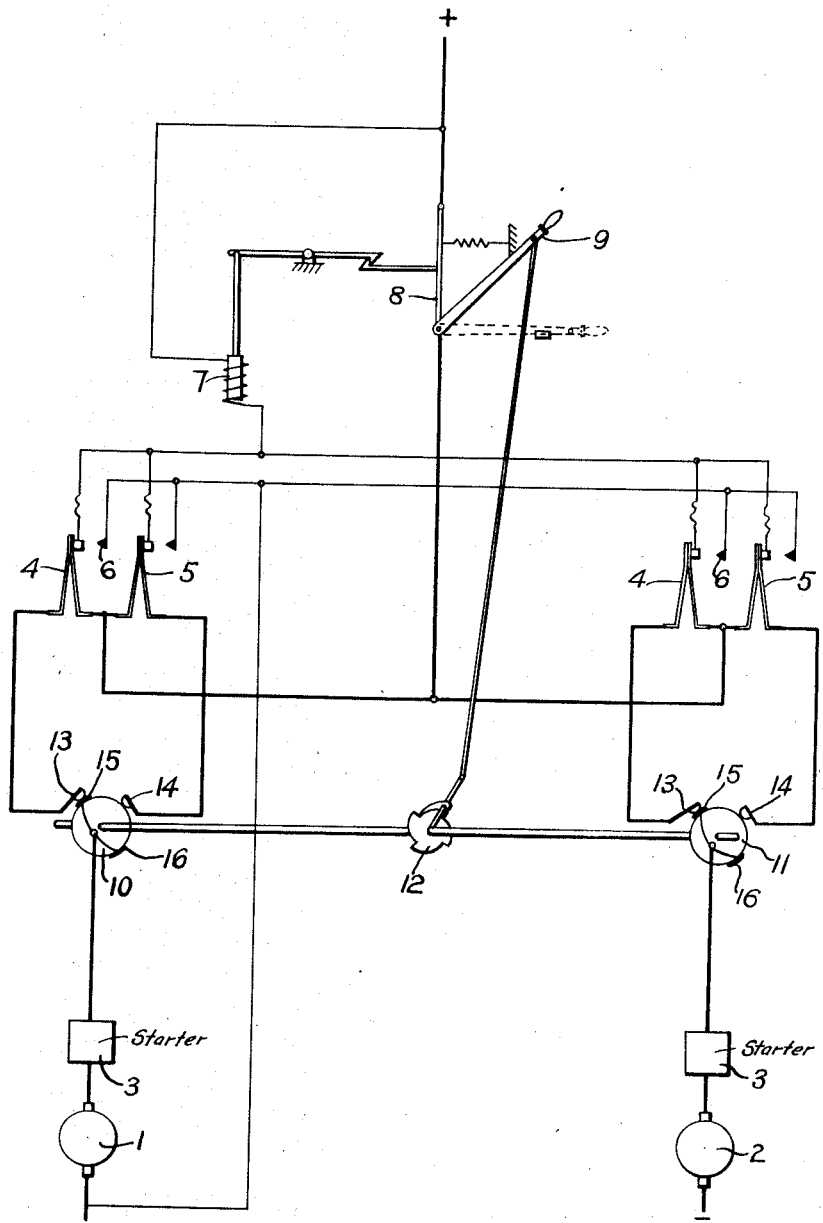
WITNESSES:
INVENTOR
Hans Beiersdorf,
BY
Wesley G. Carr
ATTORNEY Patented Nov. 27, 1928.

UNITED STATES PATENT OFFICE.

HANS BEIERSDORF, OF BERLIN-GRUNEWALD, GERMANY, ASSIGNOR TO WESTINGHOUSE ELECTRIC AND MANUFACTURING COMPANY, A CORPORATION OF PENNSYLVANIA.

THERMAL PROTECTIVE SYSTEM.

Application filed October 29, 1925, Serial No. 65,632, and in Germany October 30, 1924

My invention relates to protective systems, and particularly to protective systems embodying thermal devices.

Thermal devices are extensively employed in electrical systems where a relatively long time element is desired, such as for the protection of electrical apparatus from overheating resulting from sustained overloads. Ordinary thermal devices of this character have the disadvantage that a relatively long time is required for the device to be restored to its initial condition after it has operated. In other types of resetting time-element relays, the means for resetting the movable element in a relatively short period of time is complicated and necessitates an expensive construction.

An object of my invention is to overcome the above-mentioned disadvantage by providing a plurality of devices that are operative successively. This arrangement permits thermal devices to be employed in certain applications where it is necessary that the system be in an operative condition immediately after the thermal device has completed its function.

A further object of my invention is to provide in connection with an electrical circuit, two protective relays that are alternately responsive to a predetermined condition in the circuit.

In certain motor installations, such as on hoists or cranes, the motor may be overloaded by continuous operation with heavy loads, although the crane may be adapted to handle such loads intermittently. If a single thermal relay is provided for the protection of the motor, protection against overloads is obtained, but after the thermal device has operated, it is necessary to wait until it has become reset to its initial position before resuming operation of the crane. It may be necessary to maintain the apparatus in service, although possibly at a reduced load.

In accordance with my invention, a second thermal relay is provided and it is automatically rendered effective when the first relay has operated. Since the initial operation of the relay serves as a signal that the apparatus is overloaded, the possibility of injuring the driving motor is overcome by temporarily reducing the load thereon.

For a more complete understanding of my invention, reference should be had to the accompanying drawing, the single figure of which is a diagrammatic view of a crane installation embodying my invention.

Referring to the drawing, the installation comprises two motors 1 and 2 that may be operated either simultaneously or in sequence to operate the mechanism of the crane (not shown). A motor starter 3 is provided in the circuit of each motor. Two thermal relays 4 and 5 are connected in series with each of the motors and control, through their respective contact members, the circuit of a trip coil 7 of a circuit-interrupter 8 in the circuit of the motors. As shown, the thermal relays 4 and 5 comprise bimetallic heating elements connected in series relation in the main circuit of the motors in such manner as to be heated in accordance with the current traversing the circuit to close the associated contact members 6 if the motors are subjected to a sustained overload.

The circuit-interrupter 8 may be manually reclosed by means of a handle 9. Two switches 10 and 11 are connected in the circuit of the thermal relays 4 and 5 and are controlled by the handle 9 of the circuit-interrupter through the instrumentality of pawl-and-ratchet mechanism 12. The switches 10 and 11 comprise stationary contact members 13 and 14, angularly displaced by 90°, and movable contact members 15 and 16, angularly displaced by 180° and connected together.

If either one of the motors is overloaded, the associated thermal relay 4 is operated, thereby energizing the trip coil 7 of the circuit-interrupter 8 and opening the circuit of the motor. If it is necessary to continue the operation of the crane without delay, the operator recloses the circuit-interrupter 8 by means of the operating handle 9. The reclosure of the circuit-interrupter 8 connects the auxiliary thermal relays 5 in circuit through the operation of the switches 10 and 11, so that operation of the crane may be resumed at once.

While I have described the application of my invention to a particular installation, it is apparent that it may be applied to various types of apparatus and especially wherever time-element controlling means that is reset to normal in a relatively short time, is desired. Accordingly, I do not wish to be limited to the specific arrangement shown and described, except as limitations may be recited in the appended claims, as various modifications will occur to those skilled in the art.

I claim as my invention:

1. In combination, a circuit, a circuit-interrupter therein, a plurality of thermal relays associated with said circuit for controlling said interrupter and means whereby one of said relays is rendered operative after another of said relays has operated said interrupter.

2. In combination, a circuit, a circuit-interrupter therein, a plurality of thermal relays associated with said circuit for controlling said interrupter, means for heating one of said relays and means responsive to the conditions in said circuit for rendering said one of said relays inoperative and another of said relays operative.

3. In combination, a translating device, a plurality of thermal relays associated therewith and means for operatively energizing said relays alternately when said device is subjected to successive overloads.

4. In combination, a translating device, a circuit-interrupter therefor, two thermal relays for controlling said interrupter, and means associated with said interrupter for alternately connecting said relays in circuit with said device.

5. In combination, a circuit-interrupter and a plurality of protective relays associated therewith to independently control the actuation thereof, and means operable upon the successive actuation of said circuit-interrupter to alternately connect said relays in operative relation to said circuit interrupter.

In testimony whereof, I have hereunto subscribed my name this 27th day of October, 1925.

HANS BEIERSDORF.